G. L. BECKER.
SYSTEM OF MUSICAL NOTATION.
APPLICATION FILED JULY 18, 1912.

1,062,813.

Patented May 27, 1913.

*Fig. 1.*

| SCALE DEGREE | 1 | 2 | 3 | 4 | 5 | 6 | 7 | 8 |
|---|---|---|---|---|---|---|---|---|
| SCALE DEGREE NAMES | D or T | R B | M M | F S | S D | L H | T L or St | D(Tonic Sol-Fa) T(Harmonic) |
| ENLARGED BY ½ STEP | oon | A(r)n | ane | an | own | on | een | oon |
| INTERVAL NAMES FROM FIRST DEGREES OF MAJOR SCALE | oo Primes | ah Seconds | ay Thirds | ai Fourths | o Fifths | awe Sixths | ee Sevenths | oo Octaves |
| LESSENED BY ½ STEP | | ahl | ale | (p)al | ole | all | eel | ool |
| LESSENED BY WHOLE STEP | | ahlz | ailz | (p)alz | ohlz | awlz | eelz | oolz |

*Fig. 2.*

\

See

*Fig. 3.*

/

Fole

WITNESSES

INVENTOR
Gustav L. Becker
BY 
ATTORNEY

UNITED STATES PATENT OFFICE.

GUSTAV L. BECKER, OF NEW YORK, N. Y.

SYSTEM OF MUSICAL NOTATION.

1,062,813.  Specification of Letters Patent.  Patented May 27, 1913.

Application filed July 16, 1912. Serial No. 710,330.

*To all whom it may concern:*

Be it known that I, GUSTAV L. BECKER, a citizen of the United States, residing in the borough of Manhattan, city of New York, in the county of New York and State of New York, have invented certain new and useful Improvements in Systems of Musical Notation, of which the following is a specification, reference being had therein to the accompanying drawings, forming part thereof.

My invention relates to systems of musical notation and embodiments of my invention are particularly adapted for use in the teaching of musical sight reading, especially for vocal rendition.

An object of my invention is to provide a system which will be simple and easy of comprehension, and which will accentuate and develop in the student simultaneously a definite sense both of tonality and of intervals.

Another object is to provide a system which may be written and read without a staff.

Other objects and advantages of my invention will appear from the following description.

Of the various systems of syllabification for musical notation heretofore employed, no system has been effective in giving to the student an equal appreciation both of scale tone and interval. All have been deficient in their potency to give the true appreciation of either one or the other of these desideratums. For example, the so called "movable do" systems, as a rule, present an accurate understanding of tonality, but they leave the student seriously deficient in interval knowledge, while the "fixed do" systems have cultivated the intervals in a general way but have neglected the sense of tonality. The "fixed do" systems roughly indicate the dimensions of the intervals but they do not enable the pupil to take down from dictation of such syllables any melody containing modulations or chromatic changes, unless there be added certain explanatory words such as "dièse" for sharps or "bemol" for flats, which encumber the vocal rendition.

Nearly all the systems employed in the early history of music, such as that of Guido or Arezzo and the old Indian Sanscrit system, always employed the same syllable for the same pitch of tone, though there were certain exceptions to this rule, such, for example as the ancient Hebrew music which employed certain names for their six scale signs which were indicated by symbols placed over or under the words to be chanted. Other systems, such as those of Franz Wüllner and Friedlander in Germany and Hullah in England, were systems of interval reading, and applied a knowledge of all intervals by reading from the staff with notes, regardless of key. Still other systems used number singing to indicate scale degree, while others used a certain fixed syllable for every chromatic tone. The well known tonic sol-fa system of John Curwen employs the syllables do, ray, mee, fah, sol, la, tee, and in this system do always represents the first degree of the scale regardless of the change in key while the correct appreciation of intervals is not sufficiently emphasized. Efforts have been made to improve these systems, notably by Samuel W. Cole of Boston, Massachusetts, who lately developed a system which employs certain vowel sounds to indicate intervals in the abstract, and certain prefixed consonants to indicate the nature of the intervals, that is, whether they be major, minor, perfect, diminished or augmented. While this system gives a definite idea of the interval to be sung, it is defective in that it does not develop coincidentally a sense of tonality.

My invention aims to obviate the disadvantages of the systems heretofore used, and to provide a system of syllabification which combines the advantages of both the "movable do" systems and of those employing definite syllable indications, but which is simpler and more effective in the teaching of a correct appreciation of either intervals or tonality than any which have preceded.

To this end, my invention comprehends the use of certain interval names, preferably suitable vowel sounds, combined with suitable scale degree names, such as suitable consonants, which are preferably prefixed to the interval names, to denote the scale degree tones to be sung and the numerical names of the interval to be taken.

My invention also comprehends, in combination with the interval names and the scale degree names, the use of interval describing names, such as suitable consonants, which are preferably suffixed to the interval names, to indicate the specific size of the intervals, and while these interval describing names may be used in combination with every interval name, they are preferably used only when the intervals are not normal majors or perfect intervals.

My invention also comprehends the employment of suitable symbols to indicate whether the progression is upward or downward.

My invention also comprehends various other features and combinations and has various other advantages, as will hereinafter more fully appear.

I shall now describe the embodiment of my invention illustrated in the accompanying drawings and shall thereafter point out my invention in claims.

As interval names, to denote the intervals, I prefer to employ appropriate vowel sounds such, for example, as "oo" for a prime or for the initial tone of any composition or detached part thereof, "ah" for a second, "ay" for a third, "ai" (as in air) for a fourth, "o" for a fifth, "awe" for a sixth, "ee" for a seventh and "oo" for an octave. For indicating the scale degrees, I prefer to select as scale degree names, easily recognizable consonants, and to prefix these to the interval names. These scale degree names for example, may be the beginning consonants of the tonic sol-fa system, as D, R, M, F, S, L, T, or, if desired, the initial letters of the modern harmonic terms of the scale degrees may be employed, substituting some suitable letters for the duplicates as T (tonic), B (above tonic instead of supertonic), M (mediant), S (subdominant), D (dominant) H (half way to subdominant instead of submediant) and L (leading note) or St (when depressed for sub-tonic). The intermediate chromatic tones may be indicated by the consonants P (passing up) and G (going down). It will be apparent that these initial letters may be easily remembered, and that they combine with the interval names to form syllables which are easily sung. Thus for instance if the composition be in the key of G and the initial note be A, then in my system, if using the tonic sol-fa consonants, the initial syllable will be "Roo," and if the next interval be a third higher, the next syllable will be "Fay," or if it be a fourth higher, it will be "Sai," etc., thereby indicating both the scale degree of the particular tone to be sung and the interval to be taken from the tone last sung.

If the size of the interval to be taken be not a normal major interval, as formed from the first degree of the major scale upward, I combine with the scale degree and interval names, interval describing names, and these are preferably liquid or semi-liquid consonants, suffixed to the syllable, such as "n," "ng," "v," "l," or "z." For example the added consonant "n" may be used to indicate that a standard interval is enlarged by one-half step, and the consonant "l" to indicate that the interval is lessened by one-half step, and the double consonant "lz" to indicate that the interval is lessened by a whole step. Thus, in the example given above if the fourth be enlarged by one half step, the syllable will be "sain" and if the fourth be lessened by one half step, it will be "sal," and so forth.

In Figure 1 of the drawings, the above described embodiment of my invention is illustrated by a table, in which both the tonic sol-fa and the harmonic scale degree names are tabulated, together with the interval names from the first degree of the major scale, and in which the syllables denoting the respective intervals enlarged by one-half step, lessened by one-half step, and lessened by a whole step, are tabulated.

To indicate whether the progression is upward or downward suitable symbols may be employed in conjunction with each interval. For example, short slanting lines may be used for this purpose placed in juxtaposition to each syllable, such as a short line slanting to the right, as shown in Fig. 2 to indicate that the progression is upward, and a short line slanting to the left, as shown in Fig. 3 to indicate that the progression is downward. Thus the combination of Fig. 2 indicates that the next tone to be sung is the fifth scale degree and is a seventh down from the last tone sung, while the combination of Fig. 3 indicates that the tone is the fourth scale degree and is a fifth lessened by one half step upward from the last tone sung. The length of the tones may also be indicated by suitable scale signs in writing, or by the length of time the note is dwelt upon in dictating. Every descriptive characteristic about a tone may, therefore, be indicated and music may be dictated by my system without the necessity of employing any qualifying or descriptive expressions, and the need of a scale is eliminated.

I use the term vowel herein to mean either a single vowel or a diphthong, and I use the term consonant to denote either a single or a double consonant.

It will be noted that, while my system is easily comprehensible, it is capable of embodiment in a vast number of forms, and that it clearly and precisely indicates to the student both the tone to be sung and the interval to be taken, and therefore gives him a correct appreciation of both.

It is obvious that various modifications may be made in the embodiment shown in the drawings and above particularly described within the principle and scope of my invention.

I claim:

1. A system of musical notation, comprising a set of scale degree names and a set of interval names, any one of the scale degree names being adapted to be combined with any one of the interval names to make an easily vocalizable combination and to denote both the tone to be sung and the interval to be taken.

2. A system of musical notation, comprising a set of suitable consonants to denote scale degrees, and a set of suitable vowels to denote intervals, any one of the scale degree consonants being adapted to be combined with any one of the interval vowels to make an easily vocalizable syllable and to denote both the tone to be sung and the interval to be taken.

3. A system of musical notation, comprising a set of suitable consonants to denote scale degrees, and a set of suitable vowels to denote intervals, any one of the scale degree consonants being adapted to be prefixed to any one of the interval vowels to make an easily vocalizable syllable and to denote both the tone to be sung and the interval to be taken.

4. A system of musical notation, comprising a set of scale degree names, a set of interval names, and a set of interval describing names, any one of the scale degree names being adapted to be combined with any one of the interval names, and any of such combinations being adapted to be combined with any one of the interval describing names to make an easily vocalizable combination and to denote the tone to be sung, the interval to be taken, and the character of the interval to be taken.

5. A system of musical notation, comprising a set of suitable consonants to denote scale degrees, a set of suitable vowels to denote intervals, and a set of suitable consonants to describe the intervals, any one of the scale degree consonants being adapted to be combined with any one of the interval vowels and any of such combinations being adapted to be combined with any one of the interval describing consonants to make an easily vocalizable syllable and to denote the tone to be sung, the interval to be taken and the character of the interval to be taken.

6. A system of musical notation, comprising a set of suitable consonants to denote scale degrees, a set of suitable vowels to denote intervals, and a set of suitable consonants to describe the intervals, any one of the scale degree consonants being adapted to be prefixed to any one of the interval vowels and any one of the scale describing consonants being adapted to be suffixed to any one of such combinations, to make an easily vocalizable syllable and to denote the tone to be sung, the interval to be taken and the character of the interval to be taken.

7. A system of musical notation, comprising a set of scale degree names and a set of interval names, any one of the scale degree names being adapted to be combined with any one of the interval names to make an easily vocalizable combination and to denote both the tone to be sung and the interval to be taken, and two suitable symbols adapted to be placed in juxtaposition to such combinations to denote upward and downward progression, respectively.

8. A system of musical notation, comprising a set of scale degree names, a set of interval names, and a set of interval describing names, any one of the scale degree names being adapted to be combined with any one of the interval names, and any of such combinations being adapted to be combined with any one of the interval describing names to make an easily volcalizable combination and to denote the tone to be sung, the interval to be taken, and the character of the interval to be taken, and two suitable symbols adapted to be placed in juxtaposition to such combinations to denote upward and downward progression, respectively.

In testimony whereof I have affixed my signature in presence of two witnesses.

GUSTAV L. BECKER.

Witnesses:
WM. ASHLEY KELLY,
BERNARD COWEN.